(12) United States Patent
Moran

(10) Patent No.: US 8,493,282 B2
(45) Date of Patent: Jul. 23, 2013

(54) HANDHELD DEVICE WITH SECONDARY SCREEN FOR SOFT KEY DESCRIPTORS

(75) Inventor: Dov Moran, Kefar Saba (IL)

(73) Assignee: Google Inc., Mountain View, CA (US)

( * ) Notice: Subject to any disclaimer, the term of this patent is extended or adjusted under 35 U.S.C. 154(b) by 811 days.

(21) Appl. No.: 12/272,772

(22) Filed: Nov. 17, 2008

(65) Prior Publication Data

US 2010/0123643 A1    May 20, 2010

(51) Int. Cl.
*G06F 3/02* (2006.01)
(52) U.S. Cl.
USPC .......................................... 345/1.1; 345/173
(58) Field of Classification Search
USPC ................ 345/169, 173, 156, 168; 455/556.1
See application file for complete search history.

(56) References Cited

U.S. PATENT DOCUMENTS

| | | | |
|---|---|---|---|
| 5,625,673 A | 4/1997 | Grewe et al. | |
| 5,628,055 A | 5/1997 | Stein | |
| 5,809,115 A | 9/1998 | Inkinen | |
| 5,893,037 A | 4/1999 | Reele et al. | |
| 5,907,815 A * | 5/1999 | Grimm et al. | 455/557 |
| 6,188,917 B1 | 2/2001 | Laureanti | |
| 6,201,867 B1 | 3/2001 | Koike | |
| 6,243,578 B1 | 6/2001 | Koike | |
| 6,466,202 B1 * | 10/2002 | Suso et al. | 345/169 |
| 6,477,357 B1 | 11/2002 | Cook | |
| 6,516,202 B1 | 2/2003 | Hawkins et al. | |
| 6,640,113 B1 * | 10/2003 | Shim et al. | 455/566 |
| 6,690,947 B1 | 2/2004 | Tom | |
| 6,898,283 B2 | 5/2005 | Wycherley et al. | |
| 6,907,264 B1 | 6/2005 | Sterkel | |
| 6,999,792 B2 | 2/2006 | Warren | |
| 7,085,542 B2 | 8/2006 | Dietrich et al. | |
| 7,194,285 B2 | 3/2007 | Tom | |
| 7,266,391 B2 | 9/2007 | Warren | |
| 7,477,919 B2 | 1/2009 | Warren | |
| 7,515,937 B2 | 4/2009 | Lee | |
| 7,692,667 B2 * | 4/2010 | Nguyen et al. | 345/619 |
| 2002/0090980 A1 | 7/2002 | Wilcox et al. | |
| 2002/0151327 A1 | 10/2002 | Levitt | |
| 2004/0233930 A1 | 11/2004 | Colby, Jr. | |
| 2004/0248621 A1 * | 12/2004 | Schon | 455/566 |
| 2004/0268005 A1 | 12/2004 | Dickie | |
| 2005/0159184 A1 | 7/2005 | Kerner et al. | |
| 2005/0200598 A1 * | 9/2005 | Hayes et al. | 345/156 |
| 2006/0003804 A1 | 1/2006 | Liu | |

(Continued)

FOREIGN PATENT DOCUMENTS

| | | |
|---|---|---|
| EP | 1871075 A1 | 12/2007 |
| WO | 9421058 A1 | 9/1994 |

(Continued)

*Primary Examiner* — Quan-Zhen Wang
*Assistant Examiner* — Sepideh Ghafari
(74) *Attorney, Agent, or Firm* — Soquel Group LLC

(57) ABSTRACT

A handheld electronic device, including a first device including a keypad including at least one soft key, the functionalities of the at least one soft key being indicated by corresponding at least one soft key descriptor, and a second device, insertable within the first device, including a processor for operating in cooperation with the keypad, when the second device is fully inserted within the first device, and a soft key screen for displaying the at least one soft key descriptor, wherein each of the at least one soft key descriptor is displayed proximate the location of its corresponding soft key on the keypad, when the second device is fully inserted within the first device.

11 Claims, 5 Drawing Sheets

U.S. PATENT DOCUMENTS

| | | |
|---|---|---|
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1* | 1/2007 | Parikh ..................... 455/556.1 |
| 2007/0004550 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

HANDHELD DEVICE WITH SECONDARY SCREEN FOR SOFT KEY DESCRIPTORS

FIELD OF THE INVENTION

The present invention relates to user interfaces for electronic devices.

BACKGROUND OF THE INVENTION

Handheld electronic devices such as mobile phones have a limited number of available buttons for a user to perform desired functions. Standard mobile phones, for example, have a 12-key keypad, and often have additional navigational keys and "soft keys".

Soft keys are familiar buttons, located alongside a display device, which perform functions corresponding to text descriptors shown at any given time on the display device.

In distinction, hard keys have fixed functionalities generally indicated by symbols printed on the keys themselves, or printed on the keypad surface alongside the corresponding keys.

In this regard, reference is now made to FIG. 1, which is an illustration of a prior art keypad with soft keys and hard keys. The soft keys have variable functionalities and descriptors. The soft keys shown on the left have "back" and "next" functionalities, as indicated by their descriptors. The soft keys on the right have "SMS" and "Profiles" functionalities, as indicated by their descriptors. The hard keys shown on the left and on the right have the same functionalities; namely, inputting the digits 0-9 and the symbols "*" and "#", and call answer and call hang up.

Soft keys are of great advantage in enabling more functionality using a limited keypad. However, one drawback with the use of soft keys is that their descriptors occupy space on the limited display screen, thus reducing available space on the screen for displaying other content.

It would thus be of advantage to have soft keys that do not reduce the screen space available for displaying other content.

SUMMARY OF THE DESCRIPTION

Aspects of the present invention provide compound handheld devices that use the screen of a first device to display soft key descriptors for a second device.

Aspects of the present invention also provide handheld devices that include keypads having hard and soft keys, and that may include primary and secondary display screens. The primary display screen is used for displaying a graphical user interface, and the secondary display screen is used for displaying soft key descriptors. The secondary display screen is positioned near the soft keys, so that each soft key descriptor is displayed proximate its corresponding soft key.

In one embodiment, the present invention involves a modular communicator and a jacket device. The modular communicator inserts inside a cavity of the jacket. When inserted, the modular communicator provides the jacket with wireless communication capabilities, and the jacket provides the modular communicator with an enhanced user interface. The modular communicator and the jacket generally each have their own display screens. When the modular communicator is inserted into the jacket, the communicator's display screen shows through an opening of the jacket casing, or through a transparent portion of the jacket casing. The soft keys are part of the jacket user interface, and the soft key descriptors are displayed in the communicator display screen. Other content is displayed in the jacket display screen.

As such, the soft keys of the jacket do not reduce available screen space for display of other content. Moreover, the jacket may have an unlimited number of soft keys.

There is thus provided in accordance with an embodiment of the present invention a handheld electronic device, including a first device including a keypad including at least one soft key, the functionalities of the at least one soft key being indicated by corresponding at least one soft key descriptor, and a second device, insertable within the first device, including a processor for operating in cooperation with the keypad, when the second device is fully inserted within the first device, and a soft key screen for displaying the at least one soft key descriptor, wherein each of the at least one soft key descriptor is displayed proximate the location of its corresponding soft key on the keypad, when the second device is fully inserted within the first device.

There is additionally provided in accordance with an embodiment of the present invention a handheld electronic device, including a wireless communicator for transmitting and receiving voice and data communications, including a communicator display screen for displaying information, and a jacket into which the wireless communicator may be inserted, including a jacket keypad including at least one soft key, the functionalities of the at least one soft key being indicated by corresponding at least one soft key descriptor, wherein each of the at least one soft key descriptor is displayed on the communicator display screen proximate the location of its corresponding soft key on the jacket keypad, when the wireless communicator is fully inserted within the jacket.

There is further provided in accordance with an embodiment of the present invention a handheld electronic device, including a wireless communicator including a modem for transmitting and receiving voice and data communications, a communicator connector for making electrical connection with a jacket for the modular communicator, a communicator display screen for displaying information, and a communicator controller (i) for executing programmed instructions for operating the modem, (ii) for transmitting data to and receiving data from the connector, and (iii) for generating information for display on the display screen, and a jacket into which the wireless communicator may be inserted, including a jacket connector that mates with the communicator connector to make electrical connection with the wireless communicator, when the wireless communicator is fully inserted within the jacket, a jacket keypad including at least one soft key, the functionalities of the at least one soft key being indicated by corresponding at least one soft key descriptor, and a jacket controller operable (i) to receive and process user input provided via the jacket keypad, and (ii) to transmit data to and receive data from the communicator controller, via the jacket connector, in response to the user input, when the wireless communicator is fully inserted within the jacket, wherein the at least one soft key descriptor is displayed on the communicator display screen when the wireless communicator is fully inserted within the jacket.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to soft keys of handheld devices.

In one embodiment, the present invention applies to a handheld device with two screens; namely, a primary screen for displaying a graphical user interface, and a secondary screen for displaying soft key descriptors.

In another embodiment, the present invention applies to a small modular communicator that connects to "jackets". A jacket is a device that provides an enhanced user interface for the communicator, enriches the capabilities of the communicator, and is not able to operate independently when the communicator is not connected thereto.

Figure 1:
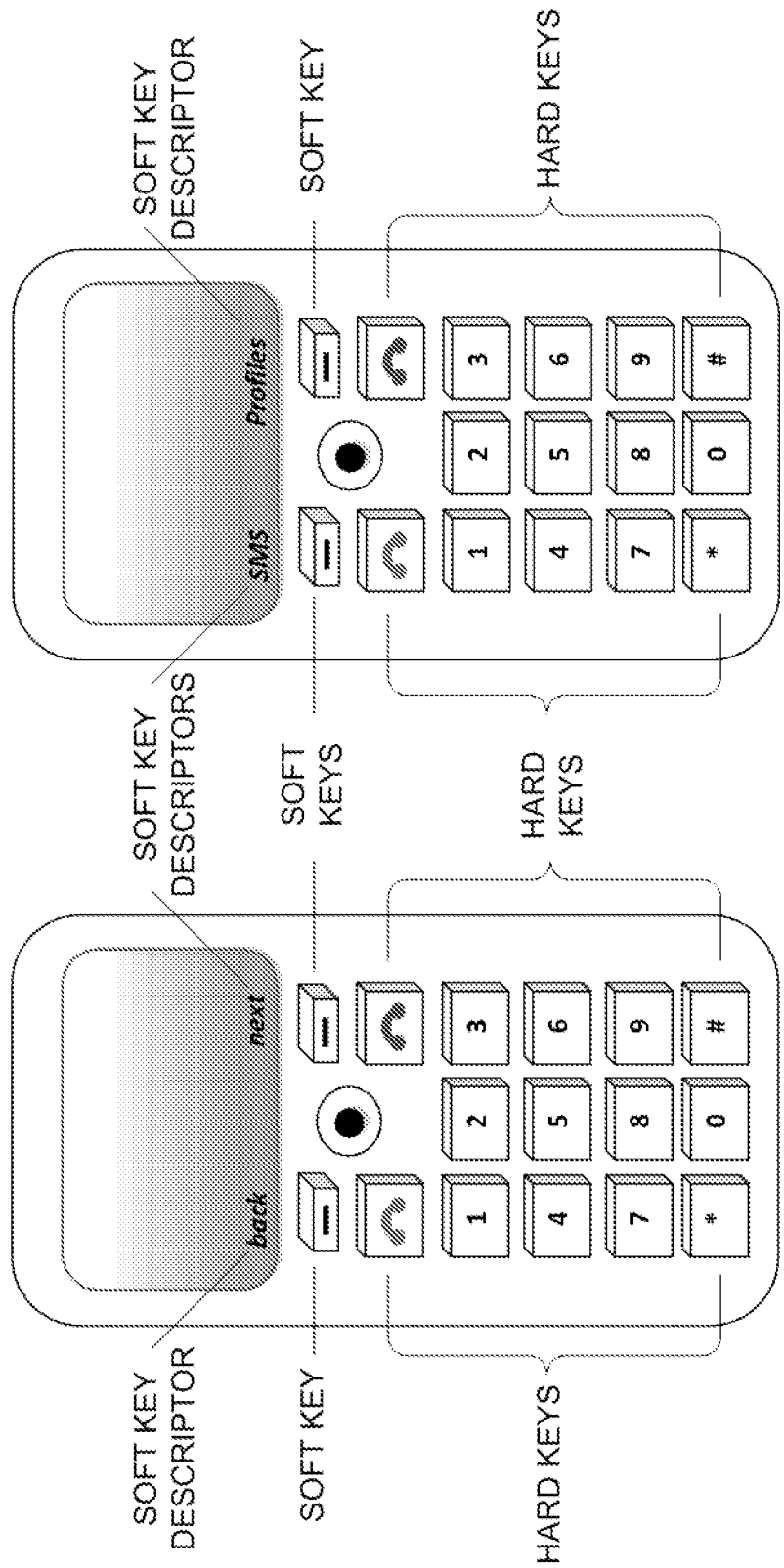
FIG. 1 is an illustration of a prior art keypad with soft keys and hard keys.
Figure 2:
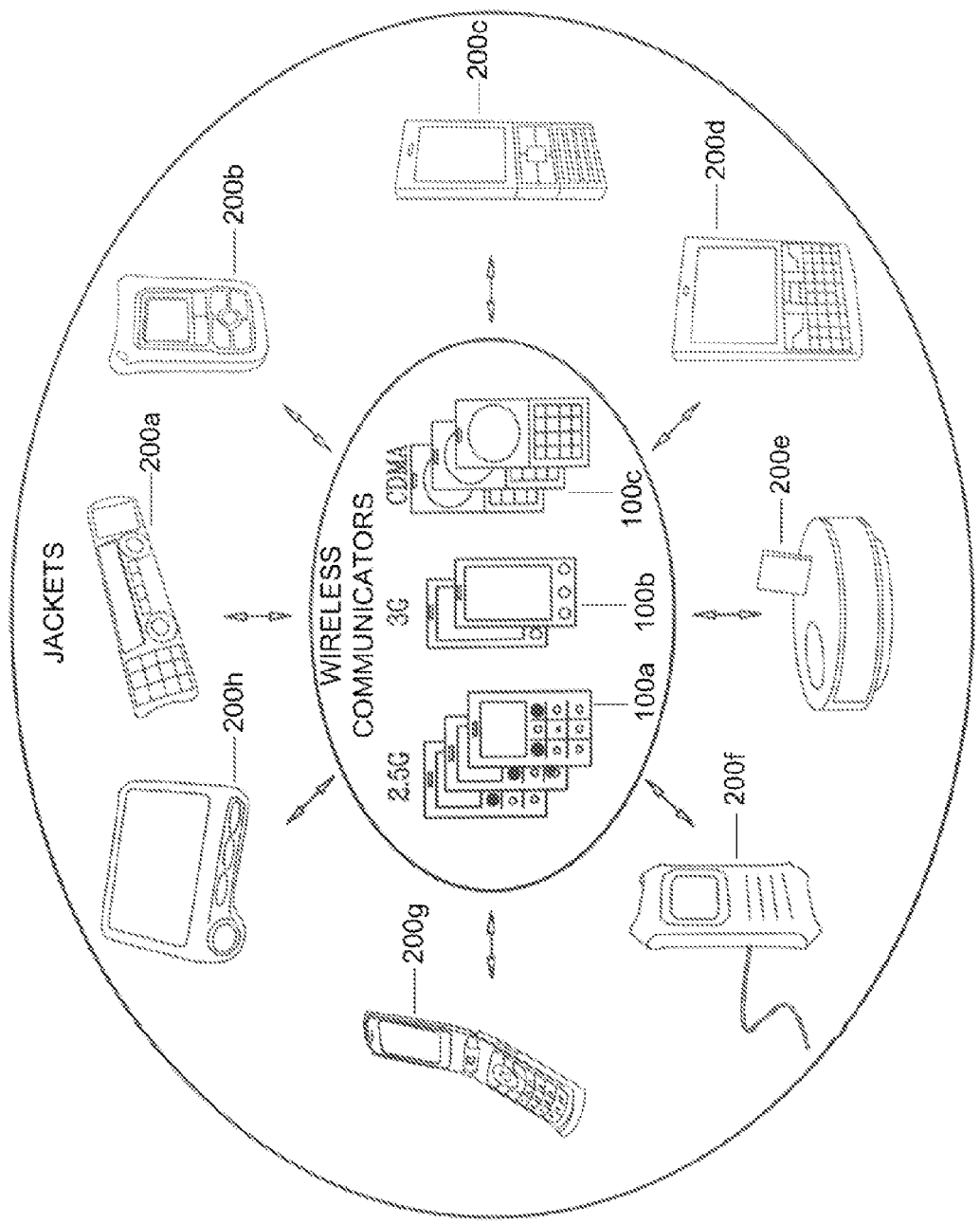
FIG. 2 is an illustration of a communication system constructed and operative in accordance with an embodiment of the present invention.

Reference is now made to FIG. 2, which is an illustration of a communication system constructed and operative in accordance with an embodiment of the present invention. Shown in FIG. 2 are a plurality of communicators 100a-100c, including 2.5G communicators for a GSM network, 3G communicators for GSM network, and CDMA communicators for a CDMA network. It will be appreciated by those skilled in the art that the networks illustrated in FIG. 2 are exemplary of a wide variety of networks and communication protocols that are supported by the communicators of the present invention, such networks and communication protocols including inter alia WiFi, Bluetooth and WiMax.

Also shown in FIG. 2 are a plurality of jackets 200a-200h. In accordance with an embodiment of the present invention, each communicator 100a-100c may be connected to any of jackets 200a-200h, so as to operate in combination therewith. Communicators 100a-100c are substantially of the same form factor and, as such, are able to be connected to each of jackets 200a-200h.

Figure 3:
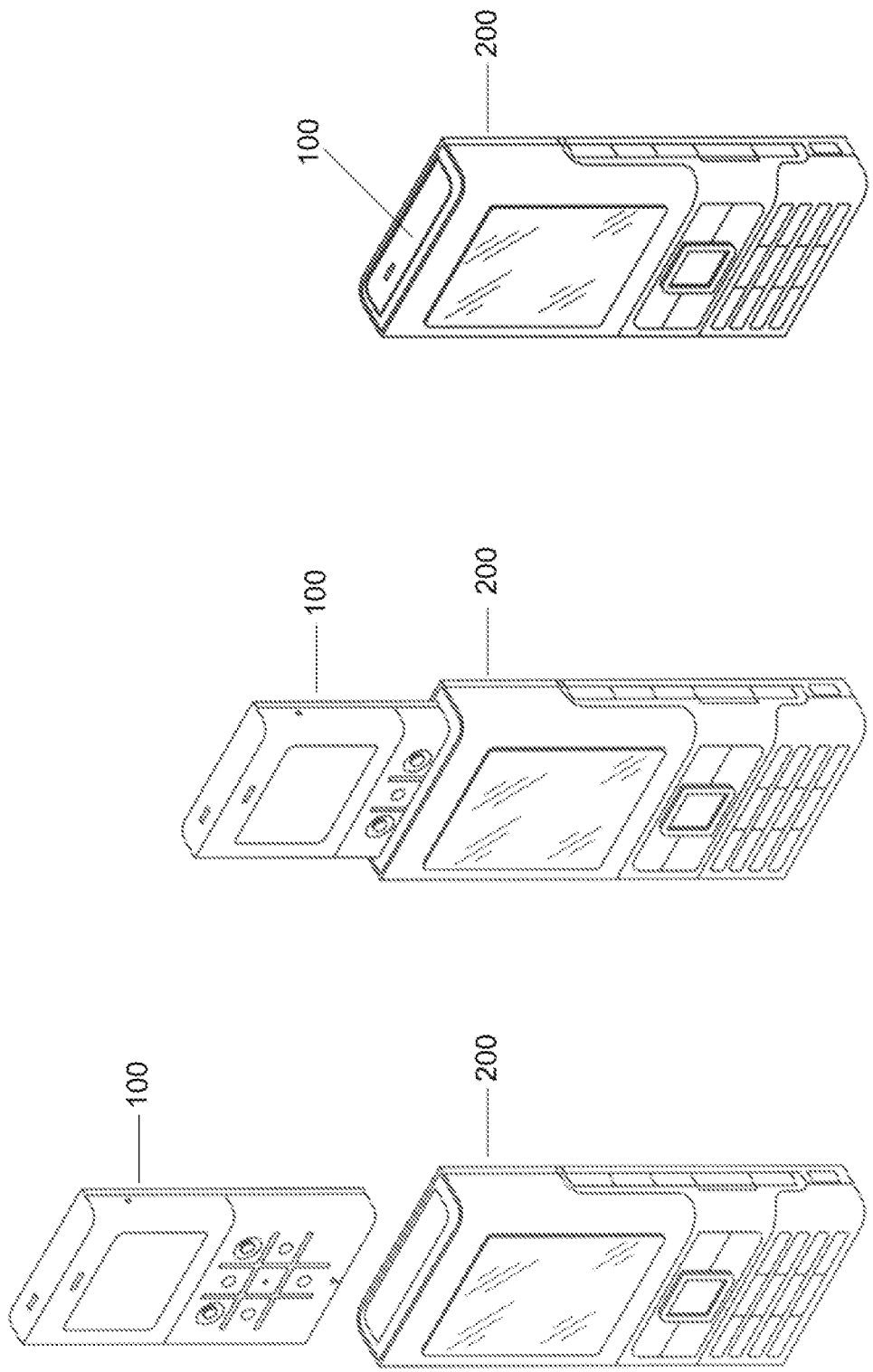
FIG. 3 is an illustration of a modular communicator being inserted into a jacket, in accordance with an embodiment of the present invention.

Reference is further made to FIG. 3, which is an illustration of a modular communicator 100 being inserted into a jacket 200, in accordance with an embodiment of the present invention. Jacket 200 as shown in FIG. 3 includes a hollow cavity at the top for insertion of communicator 100 therein.

Figure 4:
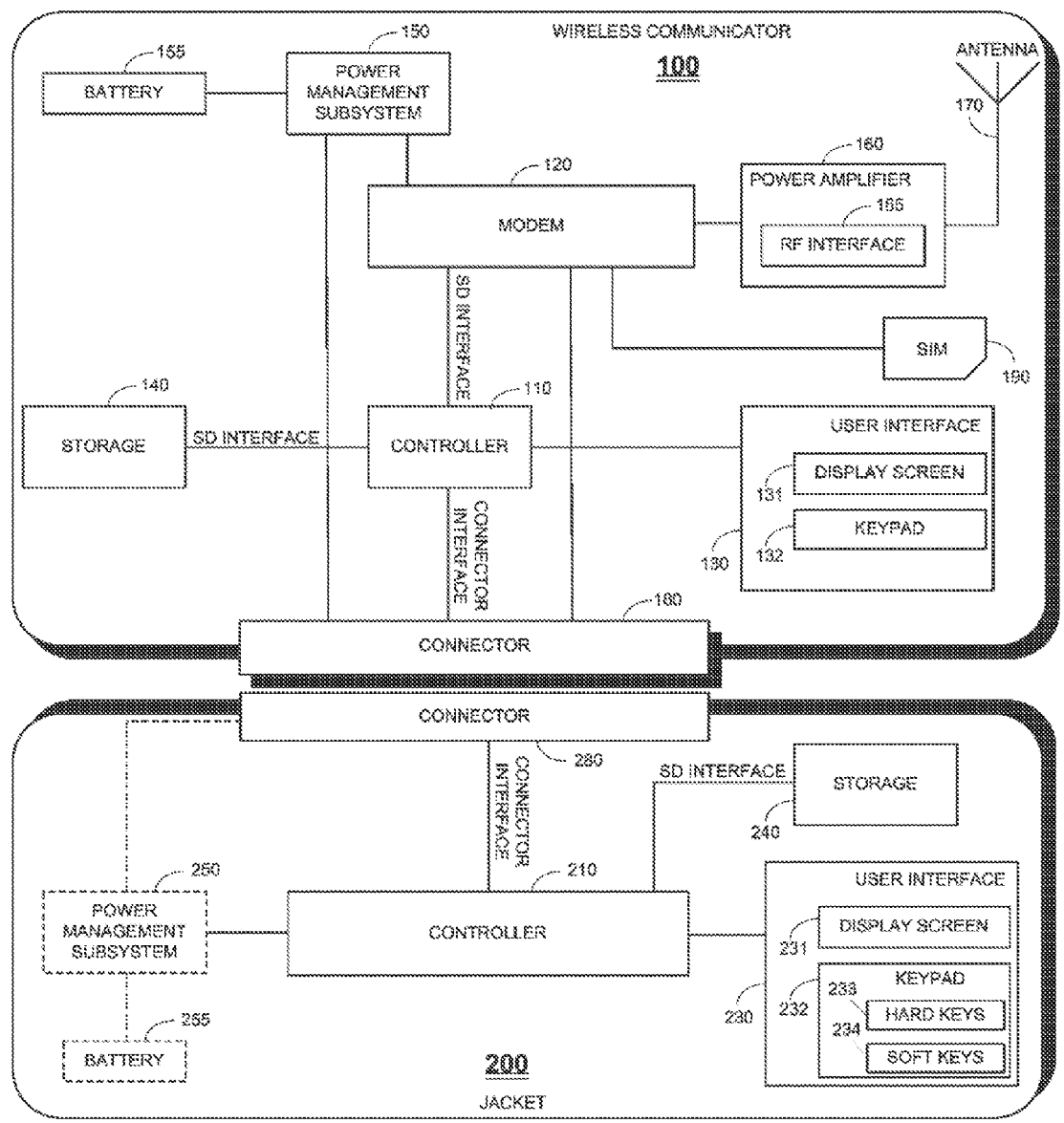
FIG. 4 is a simplified block diagram of a modular communicator and a jacket in accordance with an embodiment of the present invention.

Reference is now made to FIG. 4, which is a simplified block diagram of communicator 100 and jacket 200 in accordance with an embodiment of the present invention. Communicator 100 includes nine primary components, as follows: a controller 110, a modem 120 for sending and receiving voice and data, a user interface 130, a memory storage 140, a power management subsystem 150, a power amplifier 160, an antenna 170, a connector 180 for connecting the communicator to jacket 200, and a subscriber identification module (SIM) 190.

Controller 110 executes programmed instructions that control the data flow between communicator 100 and jacket 200. Modem 120 controls the communication functionality of communicator 100. User interface 130 includes a display screen 131 and a keypad 132. User interface 130 may optionally include additional components (not shown) such as a microphone, a headset audio jack, an earpiece, a mono speaker or stereo speakers, and a vibrator.

Power management subsystem 150 includes charging circuitry for charging a battery 155. Power amplifier 160 includes a radio frequency (RF) interface 165, and is connected to antenna 170.

In accordance with an embodiment of the present invention, the interface between controller 110 and storage 140, and the interface between controller 110 and modem 120 are both SD interfaces. The interface between controller 110 and connector 180 is a custom interface.

Jacket 200 includes four primary components, as follows: a controller 210, a user interface 230, a memory storage 240, and a connector 280 for connecting the jacket to communicator 100. Jacket 200 may include an optional power management subsystem 250 and an optional battery 255.

User interface 230 includes a display screen 231 and a keypad 232. Keypad 232 includes both hard keys 233 and soft keys 234. User interface 230 may optionally include additional components (not shown), such as a microphone, a headset audio jack, an earpiece, a mono speaker or stereo speakers, and a vibrator.

In accordance with an embodiment of the present invention, the interface between controller 210 and storage 240 is an SD interface. The interface between controller 210 and connector 280 is a custom interface.

Figure 5:
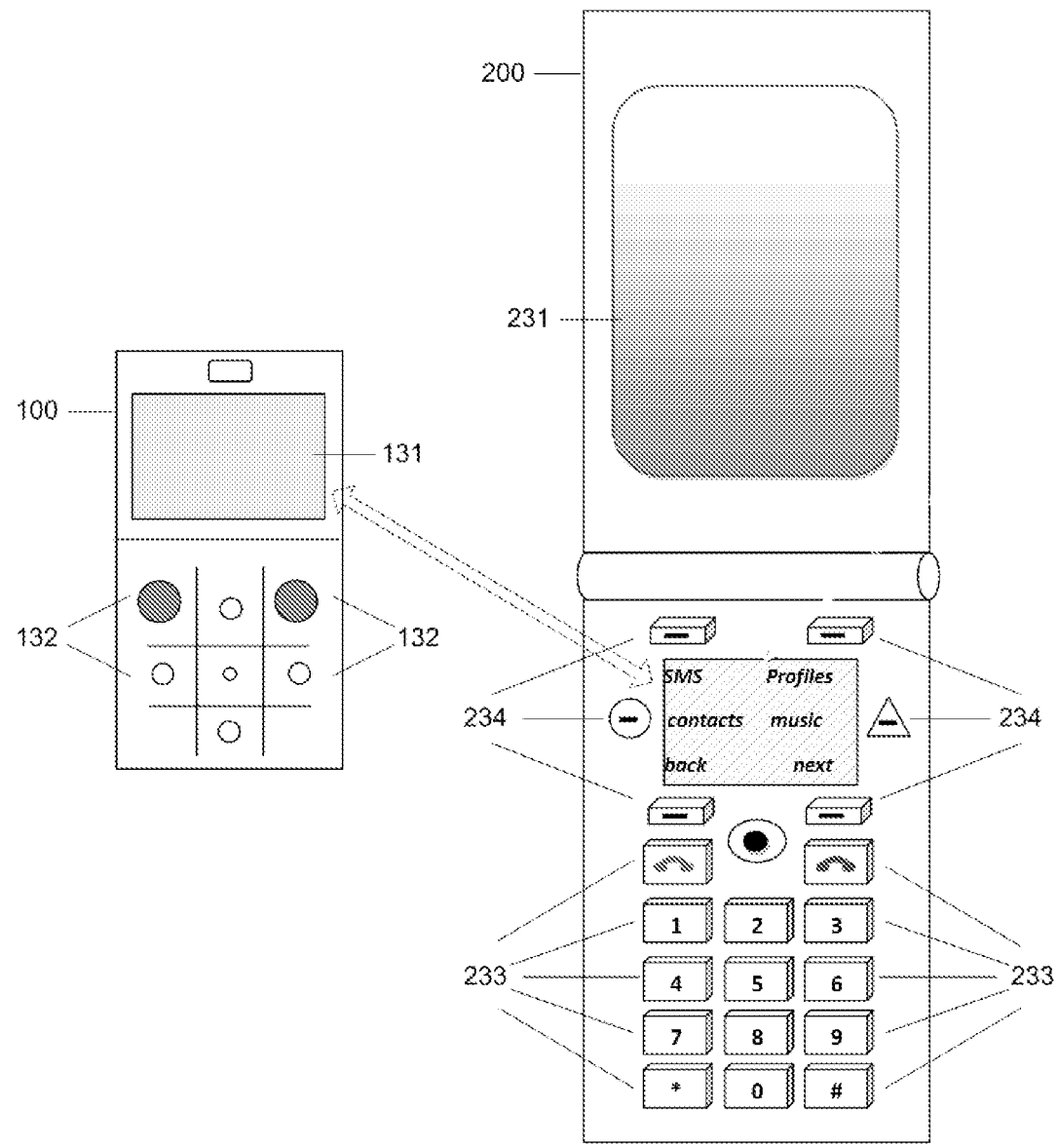
FIG. 5 is an illustration of a keypad with soft keys and hard keys, in accordance with an embodiment of the present invention.

Reference is now made to FIG. 5, which is an illustration of a keypad with soft keys and hard keys, in accordance with an embodiment of the present invention. Shown in FIG. 5 is modular communicator 100 with display screen 131 and keypad 132. Also shown in FIG. 5 is jacket 200 with display screen 231, fourteen hard keys 233 with descriptors printed on the keys themselves, and six soft keys 234. As shown, hard keys 233 and soft keys 234 are included in a body of jacket 200, and the display screen 231 is included in a flip cover of jacket 200. Hard keys 233 have fixed functionalities, and soft keys 234 have variable functionalities, which change from time to time.

Communicator 100 is inserted into jacket 200, and display screen 131 shows through a rectangular portion of the jacket casing surrounded by soft keys 234. The portion of the jacket casing through which display screen 131 shows may be an opening. Alternatively, the portion may be a transparent area of the casing. The descriptors for the soft keys, "SMS", "Profiles", "contacts", "music", "back" and "next" are displayed on screen 131 adjacent to their corresponding soft keys.

It will thus be appreciated by those skilled in the art that the present invention enables use of an unlimited number of soft keys 234 on jacket 200. The descriptors of soft keys 234 do not reduce the available screen space on screen 231, for displaying other graphical user interface content. Moreover, soft keys 234 may be designed to have a variety of shapes and sizes. The specific soft keys 234 shown in FIG. 5 have rectangular, circular and triangular shapes, but it will be appreciated that other shapes and sizes of soft keys are also within the scope of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A handheld electronic device, comprising:
   a first device comprising a physical keypad comprising at least one soft key, wherein each of said at least one soft key is a physical key with variable functionality, the functionalities of the at least one soft key being indicated at any given time by corresponding at least one soft key descriptor; and
   a second device, operative as a standalone device, slidably insertable within and slidably detachable from said first device, comprising:
      a user interface for operating the second device;
      a processor for operating in cooperation with said first device keypad, when the second device is fully inserted within said first device; and
      a soft key screen for displaying the at least one soft key descriptor,
   wherein said soft key screen shows through a portion of said first device, said at least one soft key surrounds said soft key screen on two or more sides, and each of the at least one soft key descriptor is displayed proximate the location of its corresponding soft key on said first device keypad, when the second device is fully inserted within said first device.

2. The handheld electronic device of claim 1 wherein said first device further comprises a screen for displaying a graphical user interface.

3. The handheld electronic device of claim 2 wherein said first device comprises a casing comprising a body and a flip cover, wherein said second device is insertable within said body, wherein said first device keypad is housed within said body, and wherein said first device screen is housed within said flip cover.

4. A handheld electronic device, comprising:
   a wireless communicator operative as a standalone device for transmitting and receiving voice and data communications, comprising a communicator display screen for displaying information; and
   a jacket into which said wireless communicator may be slidably inserted and from which said wireless communicator may be slidably detached, comprising a physical keypad comprising at least one soft key, wherein each of said at least one soft key is a physical key with variable functionality, the functionalities of the at least one soft key being indicated at any given time by corresponding at least one soft key descriptor,
   wherein said communicator display screen shows through a portion of said jacket, said at least one soft key surrounds said communicator display screen on two or more sides, and each of the at least one soft key descriptor is displayed on said communicator display screen proximate the location of its corresponding soft key on said keypad, when said wireless communicator is fully inserted within said jacket.

5. The handheld electronic device of claim 4 wherein the portion of said jacket through which said communicator display screen shows is an opening in a casing of said jacket.

6. The handheld electronic device of claim 4 wherein the portion of said jacket through which said communicator display screen shows is a transparent surface in a casing of said jacket.

7. A handheld electronic device, comprising:
   a wireless communicator operative as a standalone device comprising:
      a modem for transmitting and receiving voice and data communications;
      a communicator connector for making electrical connection with a jacket for the modular communicator;
      a communicator display screen for displaying information; and
      a communicator controller (i) for executing programmed instructions for operating said modem, (ii) for transmitting data to and receiving data from said connector, and (iii) for generating information for display on said display screen; and
   a jacket into which said wireless communicator may be slidably inserted and from which said wireless communicator may be slidably detached, comprising:
      a jacket connector that mates with said communicator connector to make electrical connection with said wireless communicator, when said wireless communicator is fully inserted within the jacket;
      a physical keypad comprising at least one soft key, wherein each of said at least one soft key is a physical key with variable functionality, the functionalities of the at least one soft key being indicated at any given time by corresponding at least one soft key descriptor; and
      a jacket controller operable (i) to receive and process user input provided via said keypad, and (ii) to transmit data to and receive data from said communicator controller, via said jacket connector, in response to the user input, when said wireless communicator is fully inserted within the jacket,
   wherein said communicator display screen shows through a portion of said jacket, said at least one soft key surrounds said communicator display screen on two or more sides, and each of the at least one soft key descriptor is displayed on said communicator display screen proximate the location of its corresponding soft key on said keypad, when said wireless communicator is fully inserted within said jacket.

8. The handheld electronic device of claim 7 wherein said jacket further comprises a jacket display screen for displaying a graphical user interface, and wherein said jacket controller is also operable to transfer information for display on said jacket display screen in response to the user input.

9. The handheld electronic device of claim 8 wherein the information for display on said jacket display screen is transmitted to said jacket controller by said communicator controller, when said wireless communicator is fully inserted within said jacket.

10. The handheld electronic device of claim 7 wherein the portion of said jacket through which said communicator display screen shows is an opening in a casing of said jacket.

11. The handheld electronic device of claim 7 wherein the portion of said jacket through which said communicator display screen shows is a transparent surface in a casing of said jacket.

* * * * *